(12) United States Patent
Scheibel

(10) Patent No.: US 6,689,737 B2
(45) Date of Patent: Feb. 10, 2004

(54) HOUSEHOLD CLEANING AND/OR LAUNDRY DETERGENT COMPOSITIONS COMPRISING LIGNIN-DERIVED MATERIALS

(75) Inventor: Jeffrey John Scheibel, Loveland, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/338,597

(22) Filed: Jan. 8, 2003

(65) Prior Publication Data

US 2003/0139319 A1 Jul. 24, 2003

Related U.S. Application Data

(60) Provisional application No. 60/349,777, filed on Jan. 17, 2002.

(51) Int. Cl.[7] .................................. C11D 17/00
(52) U.S. Cl. .................. 510/462; 510/492; 510/499; 523/123; 530/500
(58) Field of Search ................. 510/462, 492, 510/499; 523/123; 530/500

(56) References Cited

U.S. PATENT DOCUMENTS

| | | |
|---|---|---|
| 3,865,803 A | 2/1975 | Falkehag |
| 4,739,040 A | 4/1988 | Naae et al. |
| 5,230,814 A | 7/1993 | Naae et al. |
| 5,972,047 A | 10/1999 | Dilling et al. |
| 6,100,385 A | 8/2000 | Naae et al. |
| 6,207,808 B1 | 3/2001 | Naae et al. |

FOREIGN PATENT DOCUMENTS

| | | |
|---|---|---|
| CH | 232 099 A | 5/1944 |
| FR | 906 335 A | 12/1945 |
| WO | WO 89 06684 A | 7/1989 |

*Primary Examiner*—Necholus Ogden
(74) *Attorney, Agent, or Firm*—Laura R. Grunzinger; Kim W. Zerby; Steven W. Miller

(57) ABSTRACT

Household cleaning and/or laundry detergent compositions comprising a lignin-derived material, and lignin-derived materials themselves are provided.

8 Claims, No Drawings

HOUSEHOLD CLEANING AND/OR LAUNDRY DETERGENT COMPOSITIONS COMPRISING LIGNIN-DERIVED MATERIALS

CROSS REFERENCE TO RELATED APPLICATIONS

This application claims the benefit of U.S. Provisional Application No. 60/349,777, filed Jan. 17, 2002.

FIELD OF THE INVENTION

The present invention relates to lignin-derived materials, especially oligomeric lignin-derived dispersants, and even more especially economically viable lignin-derived materials, and household cleaning and/or laundry detergent compositions comprising such lignin-derived materials.

BACKGROUND OF THE INVENTION

Despite the fact that the majority of cleaning products comprise surfactants, it has been found that the direct action of surfactants, alone, fails to provide the most effective cleaning. Rather, other adjunct ingredients, including chelants, builders, and dispersants, are necessary to produce the maximum efficiency and effectiveness of a surfactant system. Additionally, formulations of cleaning compositions, including liquid laundry detergents, liquid dishwashing detergents and hard surface cleaners often require other ingredients to maintain stability from phase separating and effect the desired viscosity of the resultant formulation. Additionally, cleaning compositions such as granular detergent compositions, too, necessitate the employment of dispersants for effective cleaning. Indeed, formulators of liquid laundry detergent compositions have conventionally adjusted the various properties of surfactant systems and adjunct ingredients of such compositions to maintain or yield the desired stability and/or viscosity.

Accordingly, the role of certain adjunct ingredients is fundamental to the effectiveness of many surfactant-containing cleaning compositions, and specifically liquid detergent compositions. In particular, such adjunct ingredients aid a surfactant system in removing soils from fabric and/or other surfaces and prevent soil redeposition. In this respect, the role of soil dispersants is fundamental to the effectiveness of cleaning compositions, in particular laundry detergent compositions.

In general, there exist two types of soils: hydrophilic (inter alia, clay) and hydrophobic (inter alia, grease and oil). Dual-purpose dispersants, which may be effective in dispersing both hydrophilic and hydrophobic soils, may be formulated into granular laundry detergent compositions. However, the type and amount of such dispersants that can be formulated into a liquid cleaning composition, such as liquid laundry detergents, hard surface cleaning composition and dishwashing liquid compositions, is severely limited.

Those skilled in the art have attempted to resolve this dilemma via the development of ethoxylated polyalkyleneimines. Nevertheless, particularly with hydrophobic soils and certain surfactant systems, an admixture of ethoxylated polyalkyleneimine dispersants is often required to adequately suspend oily, greasy dirt. Moreover, alkoxylated polyamines tend to be less effective in dispersing hydrophobic soils when used in formulations that possess a pH low enough to result in significant protonation of the otherwise hydrophobic polyalkyleneimine backbone. A pH of less than 10 is typically required and since most liquid laundry detergent systems are in range of pH 7 to pH 10 protonation will be sufficient in both the detergent formulation but also will occur during the wash.

Thus, there exists a long felt need in the art to develop and employ efficient and cost-effective dispersants, which may be used in a wide variety of cleaning compositions. Furthermore, dispersants which can readily be modified chemically to provide increased hydrophobicity or hydrophilicity would be beneficial to the formulator of such cleaning compositions, particularly where a wide range of properties are required and performance of the dispersants is often dependent upon the interactions with other cleaning composition ingredients.

Lignin is one of the most abundant organic materials in nature and is the so-called "glue" in the cellulosic skeleton, which provides strength and support to trees and other plants. Lignin is also a major by-product of wood pulp processing in mills and, as such, often constitutes an environmental nuisance. Indeed, lignin is commonly isolated from the waste stream of pulp mills and typically burned in boilers for fuel. The structure of lignin can be represented by the following complex, partial molecular structure in formula (I).

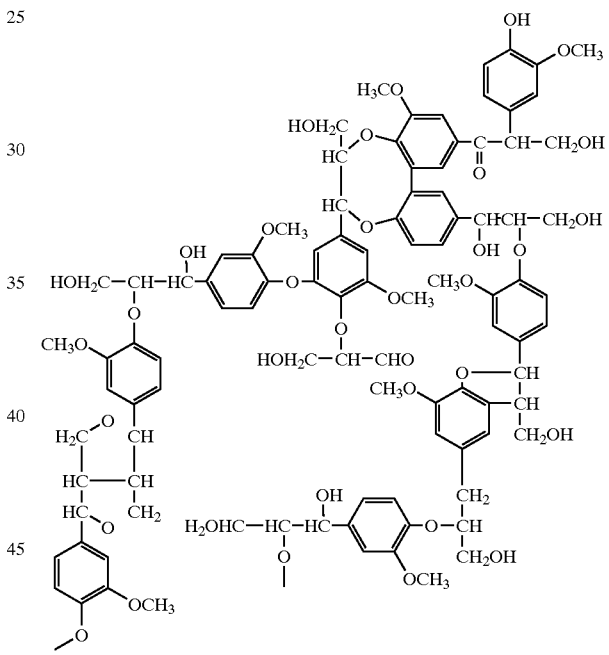

Lignin, as produced from a pulp mill, is either termed "Kraft lignin" or "lignosulfonate". Commercially available Kraft lignin is sold as INDULIN AT™. Kraft Lignin and lignosulfonate typically possess weight average molecular weights ($M_w$) of from about 3,000 to 15,000 g per mole and an oxygen content of about 20% to about 30% by total weight. Simplistically, these lignin derivatives are often described as complex polymers of phenylpropane monomer units linked by oxygen atoms. Kraft lignin and lignosulfonate are often described by the following empirical formulas: Kraft lignin, $C_9H_{6.7}O_{2.2}S_{0.1}(OCH_3)_{0.90}$, and Lignosulfonate, $C_9H_{8.2}O_{2.6}(OCH_3)_{0.94}$. In these formulas, the sulfonate groups, —$SO_3$, have been omitted in order to illustrate the number of oxygen molecules in the lignin structure.

Lignin phenol can be derived from Kraft lignin or from lignosulfonate via catalytic reduction as described in U.S.

Pat. No. 6,207,808, U.S. Pat. No. 6,100,385 and U.S. Pat. No. 5,230,814. It has been surprisingly found that lignin phenols and modified lignin phenols are effective cleaning composition ingredients that may be adapted to convey a wide variety of benefits to consumers and formulators of cleaning compositions. One representation of the lignin phenol empirical formula is described in U.S. Pat. No. 6,100,385 as having an average composition of $C_9H_{10.6}O_{0.8}(OCH_3)_{0.02}$ where two, three and four or more of these repeat units are fused together, thus providing a chemical description of the basic structural features of lignin phenol. These structural representations are not intended to constitute an all-inclusive description of the class of compounds referred to as lignin phenols. Furthermore, other, modified lignin phenols are described in the aforementioned patents and include modifications of lignin phenols by alkylation, alkoxylation, sulfonation, sulfation, alkoxysulfation, sulfomethylation and combinations thereof. Amino methylation has also been disclosed in the art but only in context of lignins and sulfonated lignins, as described in U.S. Pat. No. 5,972,047. Nevertheless, amino-methylated lignin phenols and amino-methylated modified lignin phenols have not previously been disclosed and to the extent that these compositions are novel, are claimed herein as novel.

Thus, there exists a substantial need for cleaning compositions to contain improved dispersants, such as lignin derived materials, i.e., lignin phenols and/or modified lignin phenols of the present invention. The various features of the lignin derived materials of the present invention facilitate their inclusion into household cleaning compositions, while maximizing their efficiency to act as dispersants and to aid in the function of surfactants and other adjunct ingredients of such cleaning compositions, as will become apparent from the following disclosure.

SUMMARY OF THE INVENTION

The present invention fulfills the needs identified above by providing lignin-derived materials that can be used as effective dispersants in household cleaning and/or laundry detergent compositions.

It has been surprisingly discovered that lignin derived materials such as lignin phenol and lignin phenol derivatives (otherwise known herein as "modified lignin phenols") constitute a meaningful and beneficial alternative to conventional dispersants used in cleaning compositions. The use of lignin phenols and/or lignin phenol derivatives of the present invention as dispersants in cleaning compositions provide several benefits over conventional dispersants, including, but not limited to, versatility and amenability to modification to improve the formulability of the dispersants into cleaning compositions.

In accordance with one aspect of the present invention, cleaning compositions comprising a lignin-derived materials selected from the group consisting of lignin phenols, modified lignin phenols, and mixtures thereof.

In accordance with another aspect of the present invention, novel modified lignin-derived materials, specifically amino-substituted lignin phenols, amino-substituted modified lignin phenols, amino-substituted alkylated lignin phenols, amino-substituted alkylated modified lignin phenols, and mixtures thereof. Such modified lignin-derived materials provide several advantages to consumers and formulators of cleaning compositions, as will become apparent from the following disclosure.

Another embodiment of the present invention includes a process of making a lignin phenol or a modified lignin phenol of the present invention comprising the steps of: a) performing a formaldehyde condensation of an amine with a lignin phenol; and b) optionally removing any water present and adding dimethylsulfate.

In still yet another aspect of the present invention, a method for treating a substrate in need of treatment (i.e., household surface and/or fabric article) comprising contacting the substrate with a lignin-derived material or a cleaning composition comprising such lignin-derived material such that the substrate is treated, is provided.

These and other objects, features, and advantages will become apparent to those of ordinary skill in the art from a reading of the following detailed description and the appended claims. All percentages, ratios and proportions herein are by weight, unless otherwise specified. All temperatures are in degrees Celsius (° C.) unless otherwise specified. All documents cited are in relevant part, incorporated herein by reference.

DETAILED DESCRIPTION OF THE INVENTION

The present invention relates to cleaning compositions that comprise lignin-derived materials, and such lignin-derived materials themselves. As used herein "cleaning compositions" include, but are not limited to household cleaning compositions such as hard surface cleaners (i.e., floor cleaners, glass cleaners) granular laundry detergents, liquid laundry detergents, toilet cleaners, car cleaners, carpet cleaners, appliance cleaners, wall cleaners and non-aqueous based cleaning systems, including many of the newer systems which are based on silicones, ethers or carbon dioxide, inter alia. More particularly, the present invention relates to the surprising discovery that the lignin-derived materials of the present invention, which are not based on a polyamine backbone (such as alkoxylated polyamines), may be employed as dispersants in cleaning compositions.

Lignin-Derived Materials

The lignin-derived materials in accordance with the present invention include, but are not limited to, lignin phenols, modified lignin phenols, and mixtures thereof.

Nonlimiting examples of suitable lignin phenols can be derived from Kraft lignin or from lignosulfonate via catalytic reduction as described in U.S. Pat. No. 6,207,808, U.S. Pat. No. 6,100,385 and U.S. Pat. No. 5,230,814. One representation of the lignin phenol empirical formula is described in U.S. Pat. No. 6,100,385 as having an average composition of $C_9H_{10.6}O_{0.8}(OCH_3)_{0.02}$ where two, three and four or more of these repeat units are fused together, thus providing a chemical description of the basic structural features of lignin phenol. These structural representations are not intended to constitute an all-inclusive description of the class of compounds referred to as lignin phenols.

Nonlimiting examples of suitable modified lignin phenols are described in the aforementioned patents and include modifications of lignin phenols by alkylation, alkoxylation, sulfonation, sulfation, alkoxysulfation, sulfomethylation and combinations thereof.

Nonlimiting examples of suitable novel modified lignin phenols include amino-substituted, alkylated, especially with a $C_1$–$C_6$, more especially methylated, lignin phenol and/or amino-substituted, alkylated, especially with a $C_1$–$C_6$, more especially methylated, modified lignin phenol.

These novel modified lignin phenols may be produced via the amino methylation of the lignin phenol following the known processes of amino methylation as disclosed in U.S. Pat. No. 5,972,047 to produce the novel dispersants of the present invention. Said novel dispersants are hereinafter referred to as amino-methylated lignin phenols and amino-methylated modified lignin phenols. Following known means of quaternization, the amino-methylated lignin phenols and amino-methylated modified lignin phenols of the present invention may be modified to provide yet another set of novel dispersants which can be referred to as quaternized amino-methylated lignin phenols and quaternized amino alkylated modified lignin phenols.

The novel, amino-methylated lignin phenols and amino-methylated modified lignin phenols of the present invention can be readily prepared via the based catalyzed addition of an amine with formaldehyde to the lignin phenols and modified lignin phenols described herein below. It is understood that the synthesis of the cleaning compositions of the present invention are not limited to these preparation methods.

Methods for making the lignin-derived materials of the present invention are also within the scope of the present invention and are demonstrated in the Examples 1–3 given below.

Cleaning Compositions

The lignin-derived materials of the present invention may be incorporated into cleaning compositions.

The lignin-derived materials of the present invention are highly compatible with conventional dispersants used in such cleaning compositions. For example, the lignin-derived materials are highly compatible with polyalkyleneoxy-substituted dispersants. Thus, the cleaning compositions of the present invention may include an admixture of lignin phenols and/or modified lignin phenols of the present invention and one or more polyalkyleneimine-based dispersants.

In addition to an admixture in the cleaning compositions of the present invention, the lignin-derived materials of the present invention may fully or partially replace conventional polyalkyeneimine-based dispersants in cleaning compositions.

Accordingly, the lignin-derived materials of the present invention are suitable for use in any cleaning composition, for example, granular, paste, agglomerates, liquids, structured liquids, gels, foams, bars, and the like.

In one embodiment of the present invention, a cleaning composition may comprise:
   a) from about 0.1% to about 99%, preferably from about 0.5% to about 50%, more preferably from about 1% to about 20% by weight of the cleaning composition of a lignin-derived material in accordance with the present invention; and
   b) from about 1% to about 90%, preferably from about 20% to about 80%, more preferably from about 10% to about 40% by weight of the cleaning composition of a surfactant system; and
   c) optionally, the balance carriers and other adjunct ingredients, is provided.

The surfactant system may comprise from about 0.1% to about 99%, preferably from about 1% to about 80%, more preferably from about 1% to about 60%, most preferably from about 1% to about 30% by weight of the cleaning composition, of one or more anionic surfactants. The anionic surfactants may be selected from the group consisting of linear alkyl benzenesulphonates, mid-chain branched alkyl benzenesulphonates, linear alkyl sulfates, mid-chain branched sulfates, linear alkyleneoxy sulfates, mid-chain branched alkyleneoxy sulfates, olefinsulfonates and mixtures thereof. The surfactant system may also comprise one or more nonionic surfactants selected from the group consisting of alcohols, alcohol ethoxylates, polyoxyalkylene alkylamides, alkyl polyglucosides, block polymers comprising ethylene and propylene oxides and mixtures thereof. However, other types of surfactants may be present, such as cationic, zwitterionic, betaines, amine oxides, and mixtures thereof.

Upon dilution, the compositions of the present invention may possess a pH of from about 6 to about 10.5, preferably from about 7 to about 8.5. In one aspect of the present invention, the compositions will effectuate a wash water pH, during use, of about 8.

In addition to the lignin-derived materials, the compositions of the present invention may include other materials that function as dispersants, such as hydrophobic soil dispersants, polyalkyeneimine-based dispersants, a hydrophilic soil dispersant, and mixtures thereof. A nonlimiting example of such a composition may comprise:
   a) from about 0.1% to about 10%, preferably from about 1% to about 8%, more preferably from about 1% to about 5% by weight of said composition of a soil dispersant system, said soil dispersant system comprising:
      i) from about 1% to about 99%, prefearbly from about 0.5% to about 50%, more preferably from about 1% to about 20% by weight of a lignin-derived material in accordance with the present invention; and
      ii) from about 1% to about 99%, preferably from about 0.5% to about 50%, more preferably from about 1% to about 20% by weight of said soil dispersant system of another material than in a)i) that functions as a dispersant (i.e., a hydrophobic soil dispersant and/or a polyalkyeneimine-based dispersants and/or a hydrophilic soil dispersant); and
   b) optionally, from about 1% to about 90%, preferably from about 10% to about 80%, more preferably from about 10% to about 60%, most preferably from about 15% to about 30% by weight of said composition of a surfactant system; and
   c) the balance of said composition of carriers and adjunct ingredients.

In yet another embodiment of the present invention, a composition may comprise:
   a) from about 0.1% to about 20%, preferably from about 1% to about 10%, more preferably from about 1% to about 5% by weight of said composition of a soil dispersant system, said dispersant system comprising:
      i) from about 50% to about 80% by weight of said dispersant system of a lignin-derived material according to the present invention; and
      ii) from about 20% to about 50% by weight of said dispersant system of a hydrophobic soil dispersant having the formula (II):

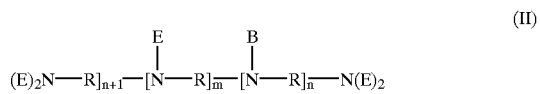

wherein R in formula II is $C_2$–$C_3$ linear or branched alkylene, E in formula II is an alkyleneoxy unit having the formula (III):

$R^1$ of formula (III) is linear or branched $C_2$–$C_4$ alkylene, k of formula (III) has an average value from 11 to 50; B of formula (II) is a continuation of the backbone by branching; the indices m and n of formula (II) have values such as the weight average molecular weight of the polyalkyleneimine backbone is from about 600 to about 5000 daltons and iii) optionally, from about 1% to about 99% by weight of said dispersant system of a hydrophilic soil dispersant having the formula (IV):

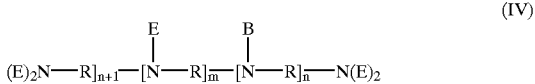

(IV)

wherein R of formula (IV) is $C_2$–$C_6$ alkylene, E of formula (IV) is an alkyleneoxy unit having the formula (V):

(V)

$R^1$ of formula (V) is ethylene; k of formula (V) has an average value from 5 to 40; B of formula (IV) is a continuation of the backbone by branching; m of formula (IV) is from 0 to 3; n of formula (IV) is from 0 to 3.

Yet another suitable dispersant for use in the dispersant systems of the present invention comprises a polyalkyleneimine having the formula (VI):

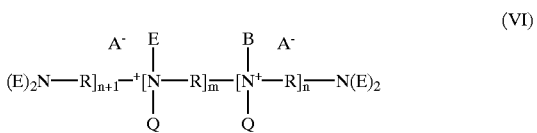

(VI)

wherein R of formula (VI) is selected from the group consisting of $C_2$–$C_8$ linear or branched alkylene, ether-substituted $C_4$–$C_{20}$ alkylene, and mixtures thereof; E of formula (VI) is an alkyleneoxy unit having the formula (VII):

(VII)

$R^1$ of formula VII is ethylene, $R^2$ of formula (VII) is selected from the group consisting of hydrogen, any compatable anionic unit, preferably sulfate, and mixtures thereof; k of formula (VII) has an average value from 1 to 50; Q of formula (VI) is $C_1$–$C_{22}$ alkyl, benzyl, and mixtures thereof; B of formula (VI) is a continuation of the backbone by branching; the indices m and n of formula (VI) have values such as the weight average molecular weight of the polyalkyleneimine backbone prior to ethoxylation and quaternization is from about 60 to about 600 daltons; A of formula (VI) is any compatable water soluble anion making the charge on the atom neutral.

Indeed, methods of modifying alkoxylated polyalkyleneimines, particularly to produce the desired compounds of one or more of the aspects of the present invention, are known in the prior art. For example, U.S. Pat. No. 5,565,145 Watson et al., issued Oct. 15, 1996, discloses hydrophobic (grease, oil) dispersants whereas U.S. Pat. No. 4,597,898 Vander Meer issued Jul. 1, 1986, discloses hydrophilic soil (clay) dispersants. Other disclosures relating to polyamine dispersants can be found in U.S. Pat. No. 4,548,744 Connor, issued Oct. 22, 1985; U.S. Pat. No. 4,561,991 Herbots et al., issued Dec. 31, 1985; U.S. Pat. No. 4,551,506 Gosselink, issued Nov. 5, 1986; U.S. Pat. No. 4,622,378 Gosselink, issued Nov. 11, 1986; U.S. Pat. No. 4,664,848 Oh et al., issued May 12, 1987; U.S. Pat. No. 4,659,802 Rubingh et al., issued Apr. 21, 1987; U.S. Pat. No. 4,661,288 Rubingh et al., issued Apr. 28, 1987; U.S. Pat. No. 4,676,921 Vander Meer, issued Jun. 30, 1987; U.S. Pat. No. 4,891,160 Vander Meer, issued Jan. 2, 1990; U.S. Pat. No. 5,858,948 Ghosh et al., issued Jan. 12, 1999; U.S. Pat. No. 5,912,221 Van Leeuwen et al., issued Jun. 15, 1999; U.S. Pat. No. 5,968,893 Manohar et al., issued Oct. 19, 1999; U.S. Pat. No. 6,004,922 Watson et al., issued Dec. 21, 1999; U.S. Pat. No. 6,057,278 Gosselink et al., issued May 2, 2000; U.S. Pat. No. 6,066,612 Murata et al., issued May 23, 2000; U.S. Pat. No. 6,071,871 Gosselink et al., issued Jun. 6, 2000; U.S. Pat. No. 6,075,000 Rohrbaugh et al., issued Jun. 13, 2000 U.S. Pat. No. 6,087,316 Watson et al., issued Jul. 11, 2000; U.S. Pat. No. 6,121,226 Gosselink et al., issued Sep. 19, 2000.

Applications

Cleaning compositions that may benefit from the addition of the lignin phenols, modified lignin phenols, amino-methylated lignin phenols, amino-methylated modified lignin phenols, quaternized amino-methylated lignin phenols and quaternized amino-methylated modified lignin phenols of the present invention include, but are not limited to, floor cleaners, glass cleaners, granular laundry detergents, liquid laundry detergents, toilet cleaners, car cleaners, carpet cleaners, appliance cleaners, wall cleaners and non-aqueous based cleaning systems, including many of the newer systems which are based on silicones, ethers or carbon dioxide. Indeed, even industrial cleaning compositions may benefit from the addition of the efficient and inexpensive dispersants of the present invention. Moreover, the dispersants of the present invention have been found to convey several benefits to laundry detergent compositions.

Surfactant System

The cleaning compositions of the present invention may comprise a surfactant system. The surfactant systems of the present invention may comprise any type of detersive surfactant, non-limiting examples of which include one or more mid-chain branched alkyl sulfate surfactants, one or more mid-chain branched alkyl alkoxy sulfate surfactants, one or more mid-chain branched aryl sulfonate surfactants, one or more non mid-chain branched sulphonates, sulphates, cationic surfactants, zwitterionic surfactants, ampholytic surfactants, and mixtures thereof.

The total amount of surfactant present in the cleaning compositions of the present invention is from about 10% by weight of the cleaning compositions. In one preferred embodiment of the present invention the range of surfactant is from about 10% to about 80% by weight of said composition. Another preferred embodiment the amount of surfactant is from about 10% to about 60% by weight of said composition wherein another preferred embodiment comprises from about 15% to about 30% by weight of said composition.

Nonlimiting examples of surfactants useful herein include:

a) $C_{11}$–$C_{18}$ alkyl benzene sulfonates (LAS);
b) $C_6$–$C_{18}$ mid-chain branched aryl sulfonates (BLAS);
c) $C_{10}$–$C_{20}$ primary, α or ω-branched, and random alkyl sulfates (AS);
d) $C_{14}$–$C_{20}$ mid-chain branched alkyl sulfates (BAS);
e) $C_{10}$–$C_{18}$ secondary (2,3) alkyl sulfates as described in U.S. Pat. No. 3,234,258 Morris, issued Feb. 8, 1966; U.S. Pat. No. 5,075,041 Lutz, issued Dec. 24, 1991; U.S. Pat. No. 5,349,101 Lutz et al., issued Sep. 20, 1994; and U.S. Pat. No. 5,389,277 Prieto, issued Feb. 14, 1995;
f) $C_{10}$–$C_{18}$ alkyl alkoxy sulfates ($AE_xS$) wherein preferably x is from 1–7;

g) $C_{14}$–$C_{20}$ mid-chain branched alkyl alkoxy sulfates (BAE$_x$S) wherein x is from 1 to 50;

h) $C_{10}$–$C_{18}$ alkyl alkoxy carboxylates preferably comprising 1–5 ethoxy units;

i) $C_{12}$–$C_{18}$ alkyl ethoxylates, $C_6$–$C_{12}$ alkyl phenol alkoxylates wherein the alkoxylate units are a mixture of ethyleneoxy and propyleneoxy units, $C_{12}$–$C_{18}$ alcohol and $C_6$–$C_{12}$ alkyl phenol condensates with ethylene oxide/propylene oxide block polymers inter alia PLURONIC® ex BASF which are disclosed in U.S. Pat. No. 3,929,678 Laughlin et al., issued Dec. 30, 1975;

j) $C_{14}$–$C_{22}$ mid-chain branched alkyl alkoxylates, BAE$_x$, wherein x is from 1 to 50;

k) Alkylpolysaccharides as disclosed in U.S. Pat. No. 4,565,647 Llenado, issued Jan. 26, 1986;

l) Pseudoquat surfactants having the formula (IX):

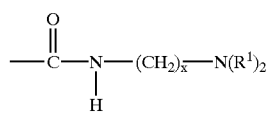

(IX)

wherein R of formula (IX) is $C_4$–$C_{10}$ alkyl, $R^1$ of formula (IX) is selected from the group consisting of $C_1$–$C_4$ alkyl, —(CH$_2$CHR$^2$O)$_y$H, and mixtures thereof; $R^2$ of formula (IX) is hydrogen, ethyl, methyl, and mixtures thereof; y of formula (IX) is from 1 to 5; x of formula (IX) is from 2 to 4. For the purposes of the present invention, a particularly useful pseudoquat surfactant comprises R of formula (IX) equal to an admixture of $C_8$–$C_{10}$ alkyl, $R^1$ of formula (IX) is equal to methyl; and x of formula (IX) equal to 3; these surfactants are described in U.S. Pat. No. 5,916,862 Morelli et al., issued Jun. 29, 1999;

m) Polyhydroxy fatty acid amides having the formula (X):

(X)

wherein $R^7$ of formula (X) is $C_5$–$C_{31}$ alkyl; $R^8$ of formula (X) is selected from the group consisting of hydrogen, $C_1$–$C_4$ alkyl, $C_1$–$C_4$ hydroxyalkyl, Q of formula (X) is a polyhydroxyalkyl moiety having a linear alkyl chain with at least 3 hydroxyls directly connected to the chain, or an alkoxylated derivative thereof; preferred alkoxy is ethoxy or propoxy, and mixtures thereof. These surfactants are described in U.S. Pat. No. 5,489,393 Connor et al., issued Feb. 6, 1996; and U.S. Pat. No. 545,982 Murch et al., issued Oct. 3, 1995.

The mid-chain branched alkyl sulfate surfactants of the present invention have the formula (XI):

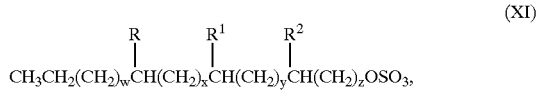

(XI)

the alkyl alkoxy sulfates have the formula (XII):

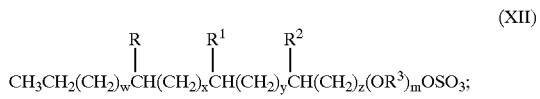

(XII)

the alkyl alkoxylates have the formula (XIII):

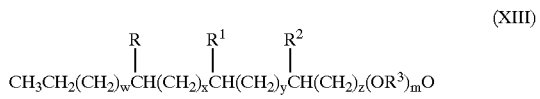

(XIII)

wherein R, $R^1$, and $R^2$ of formulas (XI), (XII), and (XIII) are each independently hydrogen, $C_1$–$C_3$ alkyl, and mixtures thereof; provided at least one of R, $R^1$, and $R^2$ is not hydrogen; preferably R, $R^1$, and $R^2$ are methyl; preferably one of R, $R^1$, and $R^2$ is methyl and the other units are hydrogen. The total number of carbon atoms in the mid-chain branched alkyl sulfate and alkyl alkoxy sulfate surfactants is from 14 to 20; the index w of formulas (XI)–(XIII) is an integer from 0 to 13; x of formulas (XI)–(XIII) is an integer from 0 to 13; y of formulas (XI)–(XIII) is an integer from 0 to 13; z of formulas (XI)–(XIII) is an integer of at least 1; provided w+x+y+z is from 8 to 14 and the total number of carbon atoms in a surfactant is from 14 to 20; $R^3$ of formulas (XII) and (XIII) is $C_1$–$C_4$ linear or branched alkylene, preferably ethylene, 1,2-propylene, 1,3-propylene, 1,2-butylene, 1,4-butylene, and mixtures thereof. Index m of formulas (XII) and (XIII) is an integer from 1 to 50.

M of formulas (XI)–(XIII) denotes a cation, preferably hydrogen, a water soluble cation, and mixtures thereof. Non-limiting examples of water soluble cations include sodium, potassium, lithium, ammonium, alkyl ammonium, and mixtures thereof.

One embodiment of the present invention may comprise 100% by weight of the surfactant system of nonionic surfactants as described hereinabove.

Enzymes

Enzymes constitute a preferred adjunct ingredient of the present invention. The selection of enzymes is left to the formulator, however, the examples herein below illustrate the use of enzymes in the cleaning compositions according to the present invention.

"Detersive enzyme", as used herein, means any enzyme having a cleaning, stain removing or otherwise beneficial effect in a cleaning composition. Preferred detersive enzymes are hydrolases such as proteases, amylases and lipases. Preferred enzymes for the present invention include, but are not limited to, inter alia proteases, cellulases, lipases and peroxidases.

Protease Enzymes

A cleaning composition according to the present invention may further comprise at least 0.001% by weight of the composition of a protease enzyme. However, an effective amount of protease enzyme is sufficient for use in the cleaning compositions described herein. The term "an effective amount" refers to any amount capable of producing a cleaning, stain removal, soil removal, whitening, deodorizing, or freshness improving effect on substrates such as fabrics. In practical terms for current commercial preparations, typical amounts are up to about 5 mg by weight, more typically 0.01 mg to 3 mg, of active enzyme per gram of the cleaning composition. Stated otherwise, the cleaning compositions herein will typically comprise from about 0.001% to about 5% by weight of the cleaning composition. Other preferred embodiments will comprise about 0.01% to about 1% by weight of the cleaning composition of a commercial enzyme preparation. The protease enzymes for use in the present invention are usually present in such commercial preparations at levels sufficient to provide from about 0.005 to about 0.1 Anson units (AU) of activity per gram of cleaning composition.

One embodiment of the cleaning compositions according to the present invention comprise modified protease enzymes derived from *Bacillus amyloliquefaciens* or *Bacillus lentus* as described in U.S. Pat. No. 5,679,630 Baeck et al., issued Oct. 21, 1997. In addition, a variant of Protease A (BPN') which is a non-naturally occurring carbonyl hydrolase variant having a different proteolytic activity, stability, substrate specificity, pH profile and/or performance characteristic as compared to the precursor carbonyl hydrolase from which the amino acid sequence of the variant is derived. This variant of BPN' is disclosed in EP 130,756 A, Jan. 9, 1985.

A further suitable protease enzyme is Protease B, a non-naturally occurring carbonyl hydrolase variant having a different proteolytic activity, stability, substrate specificity, pH profile and/or performance characteristic as compared to the precursor carbonyl hydrolase from which the amino acid sequence of the variant is derived. Protease B is a variant of BPN' in which tyrosine is replaced with leucine at position +217 and as further disclosed in EP 303,761 A, Apr. 28, 1987 and EP 130,756 A, Jan. 9, 1985. Also suitable are bleach stable variants of Protease B, specifically Protease B-BSV are variants wherein the Gly at position 166, 169, the Met at position 222 are replaced.

Another suitable protease enzyme for use in the compositions of the present invention Protease C, a variant of an alkaline serine protease from Bacillus in which lysine replaces arginine at position 27, tyrosine replaces valine at position 104, serine replaces asparagine at position 123, and alanine replaced threonine at position 274 as described in WO 91/06637, Published May 16, 1991.

Another suitable protease enzyme is Protease D, a carbonyl hydrolase variant derived from *Bacillus lentus* subtilisin having an amino acid sequence not found in nature, which is derived from a precursor carbonyl hydrolase by substituting a different amino acid for a plurality of amino acid residues as described in WO 95/10615 published Apr. 20, 1995 by Genencor International.

Suitable enzymes are disclosed in WO 92/03529 A, WO 95/10591, WO 94/25583, WO 99/20723, WO 99/20726, WO 99/20727, EP 251 446, WO 91/06637, WO 91/02792, WO 95/23221, WO 93/18140 A, WO 92/03529 A, WO 95/07791, WO 94/25583 and EP 516 200.

Commercially available proteases useful in the present invention are ALCALASE®, DURAZYM®, SAVINASE®, EVERLASE® and KANNASE®, and ESPERASE® ex Novo and MAXATASE®, MAXACAL®, PROPERASE® and MAXAPEM® ex Genencor.

In addition to proteases, amylase enzymes, non-limiting examples of which are RAPIDASE®, TERMAMYL®, FUNGAMYL®, and DURAMYL® are suitable for use in the compositions of the present invention.

In addition to proteases, cellulase enzymes, non-limiting examples of which are disclosed in U.S. Pat. No. 4,435,307 Barbesgoard et al, issued Mar. 6, 1984 GB-A-2.075.028; GB-A-2.095.275 and DE-OS-2.247.832 are suitable for use in the compositions of the present invention.

In addition lipase enzymes are suitable for use in the compositions of the present invention. Non-limiting examples of lipase enzymes are disclosed in GB 1,372,034, Lipase P Amano (Amano-P), Amano-CES, or lipases ex *Chromobacter viscosum*, e.g. *Chromobacter viscosum* var. *lipolyticum* NRRLB 3673 from Toyo Jozo Co., Tagata, Japan; *Chromobacter viscosum* lipases from U.S. Biochemical Corp., U.S.A. and Disoynth Co., The Netherlands, and lipases ex *Pseudomonas gladioli*. LIPOLASE® enzyme derived from *Humicola lanuginosa* and commercially available from Novo, see also EP 341,947, is a preferred lipase for use herein. Lipase and amylase variants stabilized against peroxidase enzymes are described in WO 94/14951 A to Novo. See also WO 92/05249 and RD 94359044.

Cutinase enzymes suitable for use herein are described in WO 88/09367 A to Genencor.

Peroxidase enzymes may be used in combination with oxygen sources, e.g., percarbonate, perborate, hydrogen peroxide, etc., for "solution bleaching" or prevention of transfer of dyes or pigments removed from substrates during the wash to other substrates present in the wash solution. Known peroxidases include horseradish peroxidase, ligninase, and haloperoxidases such as chloro- or bromo-peroxidase. Peroxidase-containing detergent compositions are disclosed in WO 89/099813 A, Oct. 19, 1989 to Novo and WO 89/09813 A to Novo.

Another suitable enzymes according to the present invention are mannanase enzymes. When present mannanase enzymes comprise from about 0.0001% to about 0.1% of the composition however in one embodiment the enzymes comprise from 0.0005% to about 2% by weight of the composition. Further aspects of the present invention relate to cleaning compositions comprising about 0.001% to about 0.02% by weight, of mannanase enzyme in said composition.

The cleaning compositions of the present invention may also comprise a xyloglucanase enzyme. Suitable xyloglucanases for the purpose of the present invention are enzymes exhibiting endoglucanase activity specific for xyloglucan. The xyloglucanase is incorporated into the cleaning compositions of the invention at a level of from 0.0001% to 2% by weight of said composition. Other embodiments comprise from 0.0005% to 0.1% by weight of said composition while another embodiment comprises from 0.001% to 0.02% by weight of said composition of pure enzyme.

The following disclose the use of suitable enzymes. U.S. Pat. No. 6,133,277 Barnabas et al., issued Oct. 17, 2000; U.S. Pat. No. 6,046,149 Sorrie et al., issued Apr. 4, 2000; U.S. Pat. No. 6,008,178 Baillely et al., issued Dec. 28, 1999; U.S. Pat. No. 5,935,271 Lappas et al., issued Aug. 10, 1999; U.S. Pat. No. 5,932,532 Ghosh et al., issued Aug. 3, 1999; U.S. Pat. No. 5,925,609 Baillely et al., issued Jul. 20, 1999; U.S. Pat. No. 5,919,272 Baillely et al., issued Jul. 6, 1999; U.S. Pat. No. 5,858,948 Ghosh et al., issued Jan. 12, 1999; U.S. Pat. No. 5,858,946 Foley et al., issued Jan. 12, 1999; U.S. Pat. No. 5,733,473 Johnston et al., issued Mar. 31, 1998.

Enzyme Stabilizing System

The cleaning compositions herein may comprise from about 0.001% to about 10% by weight of the cleaning composition of an enzyme stabilizing system. One embodiment comprises from about 0.005% to about 8% by weight of the cleaning composition of said system, while another aspect includes the range from about 0.01% to about 6% by weight of the cleaning composition of an enzyme stabilizing system. The enzyme stabilizing system can be any stabilizing system which is compatible with the detersive enzyme. Stabilizing systems can, for example, comprise calcium ion, boric acid, propylene glycol, short chain carboxylic acids, boronic acids, and mixtures thereof, and are designed to address different stabilization problems depending on the type and physical form of the detergent composition.

Stabilizing systems are disclosed in U.S. Pat. No. 4,537,706 Severson, issued Aug. 27, 1985 and U.S. Pat. No. 4,652,392 Baginski et al., issued Mar. 24, 1987.

Bleaching System

The cleaning compositions of the present invention may optionally include a bleaching system. Non-limiting examples of bleaching systems include hypohalite bleaches, peroxygen bleaching systems, or transition metal nil peroxygen systems. Peroxygen systems typically comprise a "bleaching agent" (source of hydrogen peroxide) and an "initiator" or "catalyst", however, pre-formed bleaching agents are included. Catalysts for peroxygen systems can include transition metal systems. In addition, certain transition metal complexes are capable of providing a bleaching system without the presence of a source of hydrogen peroxide.

Cleaning compositions of the present invention which contain a bleaching system, comprise:

a) from about 0.1% to about 10% by weight of the composition of a dispersant according to the present invention;

b) from about 0.01% by weight of the composition of a surfactant system. In one embodiment the compositions comprise from about 0.1% to about 60%, preferably from about 1% to about 30% by weight of the composition of a surfactant system. The surfactant systems of this aspect comprise:

i) from 0.01%, preferably from about 0.1% to about 100%, more preferably from about 1% to about 80% by weight of the surfactant system of one or more anionic surfactants. However, other embodiments comprise from 1% to about 60%, preferably from 1% to about 30% by weight of the surfactant system of one or more anionic surfactants. The anionic surfactants may be selected from the group consisting of linear alkyl benzene sulphonates, mid-chain branched alkyl benzene sulphonates; linear alkyl sulfates, mid-chain branched sulfates, linear alkyleneoxy sulfates, mid-chain branched alkyleneoxy sulfates; and mixtures thereof;

ii) optionally, from 0.01% to about 99.99%, preferably from about 0.1% to about 80% by weight of the surfactant system of a nonionic surfactant, while in another embodiment from about 1% to about 60%, preferably from about 1% to about 30% by weight of the surfactant system of one or more nonionic surfactants selected from the group consisting of alcohols, alcohol ethoxylates, polyoxyalkylene alkylamides, and mixtures thereof;

c) from about 1%, preferably from about 5% to about 80%, more preferably from about 1% to about 50% by weight of said composition of a peroxygen bleaching system comprising:

i) from about 40%, preferably from about 50% to about 99.9%, more preferably from about 60% to about 95%, most preferably from about 60% to about 80% by weight of the bleaching system of a source of hydrogen peroxide;

ii) optionally from about 0.1%, preferably from about 0.1% to about 50%, more preferably from about 5% to about 40%, most preferably from about 20% to about 40% by weight of the beaching system of a beach activator;

iii) optionally from about 1 ppb (0.0000001%), preferably 100 ppb (0.00001% to about 99.9%, more preferably from about 500 ppb (0.00005%) to about 50%, more preferably from about 1 ppm (0.0001% to about 5%, most preferably from about 1 ppm 0.0001% to about 500 ppm (0.05%) by weight of the bleaching system of a transition-metal bleach catalyst;

iv) optionally from about 0.1% by weight of the bleaching system of a pre-formed peroxygen bleaching agent; and d) the balance of said composition of carriers and other adjunct ingredients.

Bleaching Agents

Hydrogen peroxide sources are described in detail in the herein incorporated Kirk Othmer's Encyclopedia of Chemical Technology, 4th Ed (1992, John Wiley & Sons), Vol. 4, pp. 271–300 "Bleaching Agents (Survey)", and include the various forms of sodium perborate and sodium percarbonate, including various coated and modified forms.

Sources of hydrogen peroxide which are suitable for use in the compositions of the present invention include, but are not limited to, perborates, percarbonates, perphosphates, persulfates, and mixtures thereof. Preferred sources of hydrogen peroxide are sodium perborate monohydrate, sodium perborate tetrahydrate, sodium percarbonate and sodium persulfate, more preferably are sodium perborate monohydrate, sodium perborate tetrahydrate, and sodium percarbonate. When present the source of hydrogen peroxide is present at a level of from about 40% to about 100%, preferably from about 50% to about 95%, more preferably from about 60% to about 80% by weight of the bleaching system. If the compositions of the present invention are used as a pre-soak laundry detergent composition comprising a bleach system, the pre-soak laundry detergent compositions may comprise from 5% to 99% of the source of hydrogen peroxide.

A preferred percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with a silicate, borate or water-soluble surfactants.

Bleach Activators

Preferably, the source of hydrogen peroxide (peroxygen bleach component) in the cleaning compositions of the present invention is formulated with an activator (peracid precursor). The activator is present at levels of from about 0.01%, preferably the activator is present from about 0.5% to about 15%, more preferably from about 1% to about 10% by weight of the cleaning omposition. Most preferred is when the activator comprises no more than to about 8% by weight of the cleaning composition of a suitable activator. Also, bleach activators will comprise from about 0.1% to about 60% by weight of the beaching system itself. For example, when the herein described bleaching system comprises 60% by weight of the bleaching system of an activator (the preferable maximal amount for this aspect of the present invention) and said composition (bleaching composition, laundry detergent, or otherwise) comprises 15% by weight of the cleaning composition of said activator (the preferable maximal amount by weight), said composition will comprise 25% by weight of a bleaching system (60% of which is bleach activator, 40% a source of hydrogen peroxide). However, this example is not meant to restrict the formulator to a 60:40 ratio of activator to hydrogen peroxide source.

Non-limiting examples of activators are selected from the group consisting of tetraacetyl ethylene diamine (TAED), benzoylcaprolactam (BzCL), 4-nitrobenzoylcaprolactam, 3-chlorobenzoylcaprolactam, benzoyloxybenzenesulphonate (BOBS), nonanoyloxybenzene-sulphonate (NOBS), phenyl benzoate (PhBz), decanoyloxybenzenesulphonate ($C_{10}$-OBS), benzoylvalerolactam (BZVL), octanoyloxybenzenesulphonate ($C_8$-OBS), perhydrolyzable esters and mixtures thereof, most preferably benzoylcaprolactam and benzoylvalerolactam. Of particular interest in one aspect of the bleach containing compositions of the present invention are bleach activators in the pH range from about 8 to about 9.5 having an OBS or VL leaving group.

Hydrophobic bleach activators include, but are not limited to, nonanoyloxybenzene-sulphonate (NOBS), 4-[N-(nonaoyl)amino hexanoyloxy]-benzene sulfonate sodium salt (NACA-OBS) an example of which is described in U.S. Pat. No. 5,523,434, dodecanoyloxybenzenesulphonate (LOBS or $C_{12}$-OBS), 10-undecenoyloxybenzenesulfonate (UDOBS or $C_{11}$-OBS with unsaturation in the 10 position), and decanoyloxybenzoic acid (DOBA).

Non-limiting examples of bleach activators are those described in U.S. Pat. No. 5,698,504 Christie et al., issued Dec. 16, 1997; U.S. Pat. No. 5,695,679 Christie et al. issued Dec. 9, 1997; U.S. Pat. No. 5,686,401 Willey et al., issued Nov. 11, 1997; U.S. Pat. No. 5,686,014 Hartshorn et al., issued Nov. 11, 1997; U.S. Pat. No. 5,405,412 Willey et al., issued Apr. 11, 1995; U.S. Pat. No. 5,405,413 Willey et al., issued Apr. 11, 1995; U.S. Pat. No. 5,130,045 Mitchel et al., issued Jul. 14, 1992; and U.S. Pat. No. 4,412,934 Chung et al., issued Nov. 1, 1983, and WO 94/28103 and WO 84/28104; acyl lactam activators, as described in U.S. Pat. No. 5,698,504, U.S. Pat. No. 5,695,679 and U.S. Pat. No. 5,686,014, each of which is cited herein above, are very useful herein, especially the acyl caprolactams (see for example WO 94-28102 A) and acyl valerolactams, U.S. Pat. No. 5,503,639 Willey et al., issued Apr. 2, 1996.

When formulating bleach activators into laundry detergent compositions U.S. Pat. No. 5,990,070 Chapman et al., issued Nov. 23, 1999; and U.S. Pat. No. 5,905,067 Chapman et al., issued May 18, 1999, disclose means for employing liquid activators into solid or granular laundry detergent compositions Quaternary substituted bleach activators may also be included. The present cleaning compositions preferably comprise a quaternary substituted bleach activator (QSBA) or a quaternary substituted peracid (QSP); more preferably, the former. QSBA structures are further described in U.S. Pat. No. 5,686,015 Willey et al., issued Nov. 11, 1997; U.S. Pat. No. 5,654,421 Taylor et al., issued Aug. 5, 1997; U.S. Pat. No. 5,460,747 Gosselink et al., issued Oct. 24, 1995; U.S. Pat. No. 5,584,888 Miracle et al., issued Dec. 17, 1996; and U.S. Pat. No. 5,578,136 Taylor et al., issued Nov. 26, 1996.

Highly preferred bleach activators useful herein are amide-substituted as described in U.S. Pat. No. 5,698,504, U.S. Pat. No. 5,695,679, and U.S. Pat. No. 5,686,014 each of which are cited herein above. Preferred examples of such bleach activators include: (6-octanamidocaproyl) oxybenzenesulfonate, (6-nonanamidocaproyl) oxybenzenesulfonate, (6-decanamidocaproyl) oxybenzenesulfonate and mixtures thereof.

Other useful activators, disclosed in U.S. Pat. No. 5,698,504, U.S. Pat. No. 5,695,679, U.S. Pat. No. 5,686,014 each of which is cited herein above and U.S. Pat. No. 4,966,723 Hodge et al., issued Oct. 30, 1990.

Depending on the activator and precise application, good bleaching results can be obtained from bleaching systems having with in-use pH of from about 6 to about 13, preferably from about 9.0 to about 10.5. Typically, for example, activators with electron-withdrawing moieties are used for near-neutral or sub-neutral pH ranges. Alkalis and buffering agents can be used to secure such pH.

Transition Metal Bleach Catalyst

The cleaning compositions of the present invention optionally comprise a bleaching system which contains one or more bleach catalysts. Selected bleach catalysts inter alia 5,12-dimethyl-1,5,8,12-tertaaza-bicyclo[6.6.2]hexadecane manganese (II) chloride may be formulated into bleaching systems which do not require a source of hydrogen peroxide or peroxygen bleach. The cleaning compositions may comprise from about 1 ppb (0.0000001%) to about 99.9%, preferably from about 100 ppb (0.00001%) to about 50%, more preferably from about 500 ppb (0.00005%) to about 5%, more preferably from about 1 ppm (0.0001%) tp abpit 500 ppm (0.05%) by weight of the cleaning composition, of a transition-metal bleach catalyst.

Non-limiting examples of suitable manganese-based catalysts are disclosed in U.S. Pat. No. 5,576,282 Miracle et al., issued Nov. 19, 1996; U.S. Pat. No. 5,246,621 Favre et al., issued Sep. 21, 1993; U.S. Pat. No. 5,244,594 Favre et al., issued Sep. 14, 1993; U.S. Pat. No. 5,194,416 Jureller et al., issued Mar. 16, 1993; U.S. Pat. No. 5,114,606 van Vliet et al., issued May 19, 1992; U.S. Pat. No. 4,430,243 Bragg, issued Feb. 7, 1984; U.S. Pat. No. 5,114,611 van Kralingen, issued May 19, 1992; U.S. Pat. No. 4,728,455 Rerek, issued Mar. 1, 1988; U.S. Pat. No. 5,284,944 Madison, issued Feb. 8, 1994; U.S. Pat. No. 5,246,612 van Dijk et al., issued Sep. 21, 1993; U.S. Pat. No. 5,256,779 Kerschner et al., issued Oct. 26, 2993; U.S. Pat. No. 5,280,117 Kerschner et al., issued Jan. 18, 1994; U.S. Pat. No. 5,274,147 Kerschner et al., issued Dec. 28, 1993; U.S. Pat. No. 5,153,161 Kerschner et al., issued Oct. 6, 1992; and U.S. Pat. No. 5,227,084 Martens et al., issued Jul. 13, 1993; and EP 0 549 271 A1, 0 549 272 A1, 0 544 440 A2, and 0 544 490 A1.

Non-limiting examples of suitable cobalt-based catalysts are disclosed in U.S. Pat. No. 5,597,936 Perkins et al., issued Jan. 28, 1997; U.S. Pat. No. 5,595,967 Miracle et al., issued Jan. 21, 1997; U.S. Pat. No. 5,703,030 Perkins et al., issued Dec. 30, 1997; U.S. Pat. No. 4,810,410 Diakun et al, issued Mar. 7, 1989; M. L. Tobe, "Base Hydrolysis of Transition-Metal Complexes", *Adv. Inorg. Bioinorg. Mech.,* (1983), 2, pages 1–94; *J. Chem. Ed.* (1989), 66 (12), 1043–45; The Synthesis and Characterization of Inorganic Compounds, W. L. Jolly (Prentice-Hall; 1970), pp. 461–3; *Inorg. Chem.,* 18, 1497–1502 (1979); *Inorg. Chem.,* 21, 2881–2885 (1982); *Inorg. Chem.,* 18, 2023–2025 (1979); Inorg. Synthesis, 173–176 (1960); and *Journal of Physical Chemistry,* 56, 22–25 (1952).

Further examples of preferred macrocyclic ligand comprising bleach catalysts are described in WO 98/39406 A1 published Sep. 11, 1998. Suitable examples of these bleach catalysts include:

Dichloro-5,12-dimethyl-1,5,8,12-tetraazabicyclo[6.6.2] hexadecane manganese(II)
Diaquo-5,12-dimethyl-1,5,8,12-tetraazabicyclo[6.6.2] hexadecane manganese(II) hexafluorophosphate
Aquo-hydroxy-5,12-dimethyl-1,5,8,12-tetraazabicyclo [6.6.2]hexadecane manganese(III) hexafluorophosphate
Diaquo-5,12-dimethyl-1,5,8,12-tetraazabicyclo[6.6.2] hexadecane manganese(II) tetrafluoroborate
Dichloro-5,12-dimethyl-1,5,8,12-tetraazabicyclo[6.6.2] hexadecane manganese(III) hexafluorophosphate
Dichloro-5,12-di-n-butyl-1,5,8,12-tetraaza bicyclo[6.6.2] hexadecane manganese(II)

Dichloro-5,12-dibenzyl-1,5,8,12-tetraazabicyclo[6.6.2] hexadecane manganese(II)
Dichloro-5-n-butyl-12-methyl-1,5,8,12-tetraaza-bicyclo [6.6.2]hexadecane manganese(II)
Dichloro-5-n-octyl-12-methyl-1,5,8,12-tetraaza-bicyclo [6.6.2]hexadecane manganese(II)
Dichloro-5-n-butyl-12-methyl-1,5,8,12-tetraaza-bicyclo [6.6.2]hexadecane manganese(II).

Other Carriers and Adjunct Ingredients

In addition to the above-described adjunct ingredients, the cleaning compositions of the present invention may also comprise water, perfume, builders, chelants, suds suppressors, effervescent agents, optical brighteners, fabric softeners, wrinkle control agents, dye transfer inhibiting agents, suds generating agents and mixtures thereof.

Processes of Making and Using of Applicants' Cleaning Composition

The cleaning compositions of the present invention can be formulated into any suitable form and prepared by any process chosen by the formulator, non-limiting examples of which are described in U.S. Pat. No. 5,879,584 Bianchetti et al., issued Mar. 9, 1999; U.S. Pat. No. 5,691,297 Nassano et al., issued Nov. 11, 1997; U.S. Pat. No. 5,574,005 Welch et al., issued Nov. 12, 1996; U.S. Pat. No. 5,569,645 Dinniwell et al., issued Oct. 29, 1996; U.S. Pat. No. 5,565,422 Del Greco et al., issued Oct. 15, 1996; U.S. Pat. No. 5,516,448 Capeci et al., issued May 14, 1996; U.S. Pat. No. 5,489,392 Capeci et al., issued Feb. 6, 1996; U.S. Pat. No. 5,486,303 Capeci et al., issued Jan. 23, 1996.

Method of Use

The present invention includes a method for cleaning a situs inter alia a surface or fabric. Such method includes the steps of contacting an embodiment of Applicants' cleaning composition, in neat form or diluted in a wash liquor, with at least a portion of a surface or fabric then rinsing such surface or fabric. Preferably the surface or fabric is subjected to a washing step prior to the aforementioned rinsing step. For purposes of the present invention, washing includes but is not limited to, scrubbing, and mechanical agitation. As will be appreciated by one skilled in the art, the cleaning compositions of the present invention are ideally suited for use in laundry applications. Accordingly, the present invention includes a method for laundering a fabric. The method comprises the steps of contacting a fabric to be laundered with a said cleaning laundry solution comprising at least one embodiment of Applicants cleaning composition, cleaning additive or mixture thereof. The fabric may comprise most any fabric capable of being laundered in normal consumer use conditions. The solution preferably has a pH of from about 8 to about 10. The compositions are preferably employed at concentrations of from about 500 ppm to about 10,000 ppm in solution. The water temperatures preferably range from about 5° C. to about 60° C. The water to fabric ratio is preferably from about 1:1 to about 20:1.

EXAMPLE 1
Preparation of Amino-Methylated Lignin Phenol

Lignin phenol such as described in any of the following: U.S. Pat. No. 6,207,808 and U.S. Pat. No. 6,100,385 is used to prepare a 20% aqueous solution in water by addition of 50% sodium hydroxide until a pH of about 10.6 results. The solution is then treated with an amine (preferably selected from secondary amines such as dimethylamine, morpholine, imidazole and dialkylamines of various chain lengths) followed by addition of an equimolar amount of formaldehyde. The mixture is then heated at 90° C. for 3–12 hours. The molar amounts of amine used per 100 g of lignin phenol are 0.05, 0.0075, 0.1 and 0.2.

EXAMPLE 2
Preparation of Amino-Methylated Modified Lignin Phenol

A modified Lignin phenol such as described in any of the following: U.S. Pat. No. 6,207,808, U.S. Pat. No. 6,100,385 or U.S. Pat. No. 5,230,814 is used to prepare a 20% aqueous solution in water by addition of 50% sodium hydroxide until a pH of about 10.6 results. The solution is then treated with an amine (preferably selected from secondary amines such as dimethylamine, morpholine, imidazole, dialkylamines of various chain lengths and oligomeric amines such as diethylene triamine) followed by addition of an equimolar amount of formaldehyde. The mixture is then heated at 90° C. for 3–12 hours. The molar amounts of amine used per 100 g of lignin phenol are 0.05, 0.0075, 0.1 and 0.2.

EXAMPLE 3
Preparation of Quaternized Amino-Methylated Modified Lignin Phenol A modified Lignin phenol such as described in any of the following: U.S. Pat. No. 6,207,808, U.S. Pat. No. 6,100,385 or U.S. Pat. No. 5,230,814 is used to prepare a 20% aqueous solution in water by addition of 50% sodium hydroxide until a pH of about 10.6 results. The solution is then treated with an amine (preferably selected from secondary amines such as dimethylamine, morpholine, imidazole, dialkylamines of various chain lengths and oligomeric amines such as diethylene triamine) followed by addition of an equimolar amount of formaldehyde. The mixture is then heated at 90° C. for 3–12 hours. The molar amounts of amine used per 100 g of lignin phenol are 0.05, 0.0075, 0.1 and the water is then stripped under vacuum to provide neat amino-methylated modified lignin phenol which is then reacted with a 1.1 to 1.2 molar excess of dimethylsulfate relative to the moles of amine added to provide the quaternized amino-methylated modified lignin phenol.

The following are non-limiting examples of the compositions according to the present invention.

TABLE I

| Ingredients | weight % | | | |
| --- | --- | --- | --- | --- |
| | 2 | 3 | 4 | 5 |
| $C_{14}$–$C_{15}$ alkyl E1.0 sulfate | 12.3 | — | — | 22.5 |
| Linear alkyl benzene sulfonate | 5.4 | 12.2 | 15.0 | 3.0 |
| $C_{8-10}$ amidopropyl amine | — | — | 1.4 | 1.5 |
| Alkyldimethyl amine oxide | — | 1.46 | — | — |
| $C_{12}$–$C_{14}$ alkyl E7.0 | 2.2 | 8.36 | 8.4 | 3.0 |
| Citric Acid | 4.0 | 3.42 | 1.0 | 2.5 |
| $C_{12}$–$C_{18}$ alkyl fatty acid | 2.0 | 8.29 | 10.0 | 3.5 |
| Rapeseed fatty acid | — | — | — | 5.0 |
| protease | 0.9 | 1.57 | — | 1.57 |
| amylase | 0.1 | 0.088 | — | 0.088 |
| cellulase | — | 0.027 | — | 0.055 |
| lipolase | — | 0.056 | — | — |
| mannanase | — | 0.0033 | — | 0.0033 |
| Sodium metaborate | — | 2.44 | 2.0 | 2.5 |
| Ca formate/$CaCl_2$ | 0.1 | 0.10 | — | 0.10 |
| Lignin derived material of Example 3 | 0.98 | 0.98 | 0.98 | 1.5 |
| Hydrophobic dispersant[1] | 0.65 | 0.76 | 0.48 | 0.76 |
| Soil release agent[2] | 0.147 | — | — | — |
| Soil release agent[3] | — | 0.10 | 0.10 | 0.10 |
| brightener | 0.1 | 0.05 | 0.1 | 0.1 |
| DTPA[4] | 0.2 | 0.2 | 0.2 | 0.2 |
| Suds suppresser | 0.60 | 0.60 | 0.60 | 0.60 |
| Water and minors | balance | balance | balance | balance |

[1]PEI 189 E15-18 according to U.S. Pat. No. 4,597,898 Vander Meer, issued Jul. 1, 1986.
[2]Soil release agent according to U.S. Pat. No. 4,702,857 Gosselink, issued Oct. 27, 1987.

TABLE I-continued

|  | weight % | | | |
|---|---|---|---|---|
| Ingredients | 2 | 3 | 4 | 5 |

[3]Soil release agent according to U.S. Pat. No. 4,968,451, Scheibel et al., issued Nov. 6, 1990.
[4]DTPA = diethylenetriaminepentaacetic acid, sodium salt.

The following examples are non-limiting granular compositions which comprise an adjunct bleaching agent.

TABLE II

|  | weight % | | | |
|---|---|---|---|---|
| Ingredients | 6 | 7 | 8 | 9 |
| Sodium $C_{11}$–$C_{13}$ alkylbenzene-sulfonate | 3.15 | 18.0 | 18.0 | 8.8 |
| Sodium $C_{14}$–$C_{15}$ alcohol sulfate | 4.11 | — | — | 0.43 |
| Sodium $C_{14}$–$C_{15}$ alcohol ethoxylate (0.5) sulfate | — | 0.8 | — | — |
| C16 Branched Alkyl Sulfate[1] | 9.6 | — | — | 1.0 |
| $C_{14}$–$C_{15}$ alcohol ethoxylate (6.5) | — | 0.5 | 1.4 | 3.52 |
| Quaternary Amine Surfactant[2] | — | 0.6 | — | — |
| Bleach activator[3] | 5.28 | — | 0.75 | — |
| Sodium tripolyphosphate | — | 20.0 | 32.0 | — |
| Zeolite A, hydrate (0.1–10 micron size) | 24.6 | — | — | 18.38 |
| Sodium carbonate | 21.78 | 15.26 | 9.4 | 15.38 |
| Poly(ethyleneglycol), MW~4000 (50%) | 0.41 | — | — | — |
| CMC (Carboxymethylcellulose) | — | 0.2 | — | 0.2 |
| Sodium Polyacrylate (45%) | 1.18 | 0.5 | 0.6 | 1.1 |
| Soil release agent[4] | — | — | — | 0.10 |
| Lignin derived material of Example 3 | 0.5 | 0.5 | 0.6 | 1.0 |
| Sodium silicate (1:6 ratio NaO/SiO$_2$)(46%) | — | 5.79 | 6.9 | 0.13 |
| Sodium Sulfate | — | — | 10.0 | 25.0 |
| Sodium Perborate | 1.0 | — | 3.63 | — |
| DTPA[5] | — | 0.3 | 0.3 | — |
| Citric acid | — | — | — | — |
| Water, additives and other minors[6] | balance | balance | balance | balance |

[1]According to U.S. Pat. No. 6,060,443 Cripe et al.
[2]Quaternary Amine Surfactant R$_2$N(CH$_3$)(C$_2$H$_4$OH)$_2$X with R$_2$ = C$_{12}$–C$_{14}$, X = Cl$^-$.
[3]Nonyl ester of sodium p-hydroxybenzene-sulfonate.
[4]Soil release agent according to U.S. Pat. No. 5,415,807 Gosselink et al., issued May 16, 1995.
[5]DTPA = diethylenetriaminepentaacetic acid
[6]Balance to 100% can, for example, include minors like optical brightener, perfume, soil dispersant, chelating agents, dye transfer inhibiting agents, additional water, and fillers, including CaCO$_3$, talc, silicates, aesthetics, etc. Other additives can include various enzymes, bleach catalysts, perfume encapsulates and others.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. The household cleaning composition comprising a lignin-derived material selected from the group consisting of amino-substituted lignin phenols, amino-substituted modified lignin phenols and mixtures thereof.

2. A cleaning composition lignin-derived material selected from the group comprising amino-substituted lignin phenol, amino-substituted modified lignin phenol, amino-methylated lignin phenol, amino-methylated modified lignin phenol, and mixtures thereof.

3. The lignin-derived material according to claim 2 wherein said lignin-derived material is quaternized.

4. A process of making a lignin phenol according to claim 1 comprising the steps of:

a) performaing a formaldehyde condensation of an amine with a lignin phenol; and b) optionally removing any water present and adding dimethylsulfate.

5. A process of making a modified lignin phenol according to claim 1 comprising the steps of:

a) performing a formaldehyde condensation of an amine with a modified lignin phenol; and b) optionally removing any water present and adding dimethylsulfate.

6. The process according to claims 4 or 5 wherein the amine is a secondary amine selected from the group comprising dimethylamine, morpholine, imidazole, dialkylamines, and oligomeric amines.

7. A method for cleaning a substrate comprising the step of contacting the substrate with a lignin-derived material selected from the group consisting of amino-substituted lignin phenols, amino-substituted modified lignin phenols and mixtures thereof.

8. A method for cleaning a substrate comprising the step of contacting the substrate with a cleaning composition comprising a lignin-derived material selected from the group consisting of amino-substituted lignin phenols, amino-substituted modified lignin phenols and mixtures thereof.

* * * * *